(12) United States Patent
Block

(10) Patent No.: US 11,363,237 B1
(45) Date of Patent: Jun. 14, 2022

(54) SYSTEM AND METHOD FOR NOTIFYING OTHERS WHEN A PERSON IS ON A CONFERENCE

(71) Applicant: Ryan Block, Aliso Viejo, CA (US)

(72) Inventor: Ryan Block, Aliso Viejo, CA (US)

(*) Notice: Subject to any disclaimer, the term of this patent is extended or adjusted under 35 U.S.C. 154(b) by 0 days.

(21) Appl. No.: 17/226,856

(22) Filed: Apr. 9, 2021

(51) Int. Cl.
| H04N 7/15 | (2006.01) |
| H04M 3/56 | (2006.01) |
| H04W 4/16 | (2009.01) |

(52) U.S. Cl.
CPC ............. *H04N 7/15* (2013.01); *H04M 3/563* (2013.01); *H04W 4/16* (2013.01)

(58) Field of Classification Search
CPC ............ H04N 7/15; H04N 7/14; H04N 7/152; H04W 4/16; H04M 3/56
USPC .......................................... 348/14.01–14.16
See application file for complete search history.

(56) References Cited

U.S. PATENT DOCUMENTS

| 7,568,151 | B2 | 7/2009 | Bargeron et al. |
| 8,125,319 | B2 | 2/2012 | Freeman |
| 8,397,264 | B2 | 3/2013 | Ansari et al. |
| 8,539,359 | B2 | 9/2013 | Rapaport et al. |
| 8,542,264 | B2 | 9/2013 | Lu et al. |
| 9,154,606 | B2 | 10/2015 | Tseng |
| 9,237,305 | B2 | 1/2016 | Guzman et al. |
| 9,258,524 | B2 | 2/2016 | DeLuca et al. |
| 9,374,693 | B1 | 6/2016 | Olincy et al. |
| 10,024,678 | B2 | 7/2018 | Moore |
| 10,044,871 | B2 | 8/2018 | Bargetzi et al. |
| 10,051,600 | B1 | 8/2018 | Zhong et al. |
| 10,148,912 | B1* | 12/2018 | Oliver ................. H04L 12/1822 |
| 10,416,882 | B2 | 9/2019 | Yang et al. |
| 10,674,007 | B2 | 6/2020 | Aggarwal et al. |
| 10,755,372 | B2 | 8/2020 | Orduna et al. |
| 2003/0202008 | A1* | 10/2003 | McDonald .............. H04L 29/06 715/736 |
| 2014/0043423 | A1* | 2/2014 | Lindberg ................ H04L 65/00 348/14.01 |
| 2014/0309999 | A1* | 10/2014 | Basson ................... G10L 25/00 704/270 |
| 2014/0357317 | A1* | 12/2014 | Mullen .................... H04B 1/38 455/557 |
| 2016/0227171 | A1* | 8/2016 | Rambo .................. H04N 7/155 |
| 2016/0357354 | A1 | 12/2016 | Chen et al. |

(Continued)

FOREIGN PATENT DOCUMENTS

JP    2019154056 A    9/2019

*Primary Examiner* — Melur Ramakrishnaiah
(74) *Attorney, Agent, or Firm* — Eandi Fitzpatrick LLP

(57) ABSTRACT

A system for alerting individuals when a user is a participant of a conference call is provided. The system has a software application downloadable to a one user device associated with a user, wherein the a user device comprises an audio or video interface that allows the user to participate on a conference call, and wherein the software application is configured to detect if the user is on the conference call, a communication interface, and a cue in communication with the software application via the communication interface, wherein the cue is configured to receive an input from software application when the user is on the conference call, and in response, trigger the cue so that the individual is alerted that the user is on a conference call.

19 Claims, 9 Drawing Sheets

(56) References Cited

U.S. PATENT DOCUMENTS

2017/0208291 A1* 7/2017 Feng ............... H04L 12/185
2019/0325355 A1  10/2019 Gladwin et al.

* cited by examiner

SYSTEM AND METHOD FOR NOTIFYING OTHERS WHEN A PERSON IS ON A CONFERENCE

FIELD OF THE INVENTION

The present invention generally relates to a system for alerting individuals when a participant of a conference call is participating in a conference call, for example, during a video and/or audio conference call. More specifically, the present invention relates to a system and method for notifying persons that a participant of a conference call is, indeed, in a conference call and should not be disturbed.

BACKGROUND

Communication networks allow multiple people to participate in a single call, typically known as a "conference call." In a conference call, audible sounds and video signals from each device, for example, a smartphone or a computer, are distributed to all of the other devices participating in the conference call. Thus, each participant in the conference call may share information with all of the other participants.

For modern and innovative businesses to grow and globalize, it is essential to build and maintain quality relationships with partners, suppliers, internal teams, investors and customers. Video and audio-conferencing calls allow users to conduct client meetings or sales presentations, project meetings and updates, regular team meetings, training classes, and communications with employees who work in different locations, etc. Video and/or audio-conferencing boosts productivity, saves time, reduces travel expenses, and overall promotes collaboration. The advantage of video conferencing is the ability to facilitate all of those benefits without requiring constant travel for face-to-face communication.

The COVID-19 pandemic, also known as the coronavirus pandemic, was declared by the World Health Organization as a Public Health Emergency of International Concern on 30 Jan. 2020. In response, many governments across the world either declared or recommended that people "social distance" to obviate the spread of the disease. In public health, social distancing, also called physical distancing, is a set of non-pharmaceutical interventions or measures intended to prevent the spread of a contagious disease by maintaining a physical distance between people and by reducing the number of times people come into close contact with each other. By reducing the probability that a given uninfected person will come into physical contact with an infected person, the disease transmission can be suppressed, resulting in fewer deaths. This has virtually destroyed typical office setting and has led to a massive increase in workers working "virtual" or rather working from home. Consequently, networked based conference call use has risen dramatically. Indeed, there was a 159% increase in remote work between 2005 and 2017 and from 2019-2022, remote work is expected to increase by 77%.

With the rise in remote conferences, learning, meetings, etc., the adoption of web conferencing software is exponentially growing and using them is becoming commonplace. Due to COVID-19, it is not uncommon for an entire family to work from home and be on different meetings throughout the day. Because it is not easy to know if someone is currently using their computer audio or video, it is quite easy for roommates, spouses and children to interrupt a user in a conference accidentally. These interruptions are unprofessional and most often distracting.

Currently, most web cameras and conferencing tools have an indicator light when the electronic device is in use. For privacy issues, there are lights built into the web cameras (internal and external) to notify the person using the electronic device that their camera is on. The light is usually a very small light that only the person participating in the conference can see.

In light of the above-mentioned problems, there is a need for a system and method to notify persons when a user is participating in a conference call.

SUMMARY OF THE INVENTION

The following summary of the invention provides a basic understanding of some aspects and features of the invention. This summary is not an extensive overview of the invention, and as such it is not intended to particularly identify key or critical elements of the invention or to delineate the scope of the invention. Its sole purpose is to present some concepts of the invention in a simplified form as a prelude to the more detailed description that is presented below.

The present invention generally discloses a system and method for notifying people e.g., that are physically proximate or accessible via electronic methods that the user is on a conference call or participating in a conference call. A visual cue such as a flag, a light, a strobe, or some other similar physical cue is enabled by the system and method to notify others the user is on a conference call. In embodiments, the system is configured to passively communicate with others by sending electronic methods in order to identify the user is on the conference call.

The present system allows a participant of a conference call to be uninterrupted by people physically proximate the participant during conference calls (e.g., video calls from home).

A system for alerting individuals when a user is a participant of a conference call is provided. The system has a software application downloadable to a one user device associated with a user, wherein the a user device comprises an audio or video interface that allows the user to participate on a conference call, and wherein the software application is configured to detect if the user is on the conference call, a communication interface, and a cue in communication with the software application via the communication interface, wherein the cue is configured to receive an input from software application when the user is on the conference call, and in response, trigger the cue so that the individual is alerted that the user is on a conference call.

In an embodiment, a system for alerting individuals when a user is a participant of a conference call, the system comprising a plug interface configured to connect to a user device, wherein when connected to the user device the plug interface is configured to communicate with an the user device to detect if the user is on the conference call, a wireless communication protocol disposed within the plug interface and a cue in communication with the plug interface via the wireless communication protocol disposed within the plug interface, wherein the cue is configured to receive an input from plug interface when the user is on the conference call, and in response trigger the cue so that the individual is alerted that the user is on a conference call.

In an embodiment, a non-transitory computer-readable medium for storing instructions that, when executed on one or more processors, cause the one or more processors to detect if a user is on a conference call by communicating with an audio or video interface of a user device, or a network traffic on which the user device resides, communicate with a communication interface on the user device to send a signal if the processor detects the use is on a conference call, send a signal to a cue in communication with the process via the communication interface, wherein the visual cue is configured to receive an input from a software application when the user is on a conference call, and in response, trigger a cue so that the individual is alerted the user is on a conference call.

In one embodiment, the system comprises downloadable software that utilizes the electronics device internal short-wave communication (e.g., Bluetooth®) or WiFi that is in communication with an external cue device. In embodiments, the downloadable software communicates with the device's visual and audio software to recognize when a user is on a conference, and in turn, signals the external cue to activate. The activation provides a visual cue to others proximate the user that the user is participating in a conference call and should not be disturbed. The system determines that a user is on a conference call by, in this embodiment, monitoring the user's device usage to check if hardware such as the the camera, speaker, microphone, and the like are in use or may monitor the device's network traffic to see if communication is occurring between conferencing providers (i.e., check if data is being sent to Zoom®), and/or communicate with applications in use by the user device.

In other embodiments, the system comprises a plug interface such as a USB or similar plug in that utilizes shortwave communication (e.g., Bluetooth®) or WiFi that is in communication with an external cue device. In embodiments, the USB comprises software that communicates with the electronic devices visual and audio software or mobile applications of the user device to recognize when a user is on a conference, and in turn, signals the external cue to activate. The activation provides a visual cue to others proximate to the user that the user is participating in a conference call and should not be disturbed. Other electronic methods may be utilized as well as described therein (e.g., messaging to smart devices).

In embodiments, the physical cue comprises a mounting device, a small tripod or stand, which is affixed to the top of the user device or electronic device, for example, a computer or a user device. In one embodiment, the mounting device, small tripod or stand may be free-standing, or attached to a surface (i.e., outside a door), or be built directly into other hardware devices (i.e., web camera, monitor, etc.). In this way, the cue may be easily seen by people proximate or around the participant. Thus, identifying the participant by others by the visual cue, for example, a flag. Once the person is "off" of their meeting, the visual cue, for example, the flag would return its "off" status so that others could easily notice the participant off their meeting. The different mounting mechanisms allows the visual signs to be used across different computing platforms (computer, mobile device, etc.). In one embodiment, the visual sign, for example, a flag could be rotated around so that it could be seen in different ways depending upon where the participant sitting in relation to others.

In another embodiment, the system is configured to electronically broadcast or signal that a user is currently in a video or audio conference call by electronic notification, for example, a push/text/SMS alert, integration with other applications such as, but not limited to, Amazon® Alexa, Slack®, Twilio® Facebook®, Outlook, and other IoT devices, via an application program interface (API), or a custom stand-alone application. For instance, when the application determines that the user is in a conference, it is configured to send a push/text/SMS message to desired recipients that are proximate to that they are in a meeting utilizing a home network such as Wi-Fi or a global network utilizing geofencing or geo-location. In one embodiment, the system may be further configured to send an auto-reply message, for example, "I am currently in a meeting, I will respond back as soon as I am done" to certain recipients. Thus, users outside of the current workspace would be notified that the person is on a conference and should not be interrupted. When the user is "off" their meeting, an electronic notification could be sent to indicate that the person is no longer in a meeting. In other embodiments, the persons may not be proximate a user, but may receive a notification that the user is on a conference call nonetheless and should not be disturbed.

In one embodiment, the visual cue may be mounted or connected to a small tripod or stand, and further comprises a processor and a memory having multiple software modules executed by the processor and/or a wireless communication protocol. In one embodiment, the notification device further comprises one or more program modules/systems, which are executed by the processor to perform multiple operations. In one embodiment, the notification device is configured to wirelessly connect to the user device or electronic device via a network. In one embodiment, the notification device is further configured to connect to the user device or electronic device via a USB cable. In one embodiment, the network is at least any one of Wi-Fi, Bluetooth®, wireless local area network (WLAN)/Internet connection, and radio communication.

In one embodiment, the LED lights may be activated and illuminated when the participant participates in a video and/or audio conference call using the electronic device, for example, a computer or a user device, thereby allowing others to identify the participant during a conference call by the visual sign using the notification device or stand provided with LED lights. The LED light may be small in size and attachable to devices or other household items. A docking station may be provided that is attached to the LED and has a USB port in the docking station. A male USB port may be provided to plug into the light In one embodiment, the notification device is connected to the user device, for example, a computer using a USB cable. In some embodiments, the notification device is configured to receive signals from the user device, for example, a computer when the audio and/or video devices, for example, a microphone and a camera are activated, thereby providing a visual sign, for example, a flag or a light in order to identify the participant who participates in a video and/or audio conference call. When it receives the "off signal" the visual sign will be turned off. The visual cue may be an LED light that turns on, a flag/tab/marker that pops up, or a sign that is illuminated. These are used in conjunction with the user's web internal or external web camera. Depending on the implementation, it may be powered via standard or rechargeable batteries, plugged in via a USB cable, other power sources, or a small set of solar cells. In other embodiments, the cue may be an audio cue.

In one embodiment, a web-camera may be provided with a housing having illumination regions, thereby providing a visual sign and allowing others to identify the user or participant during the conference call. In one embodiment, the illumination regions may be activated and illuminated when the participant participates in a video and/or audio conference call using the electronic device, for example, a computer or a user device, thereby allowing others to identify the participant during the conference call by the visual sign.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

Figure 1:
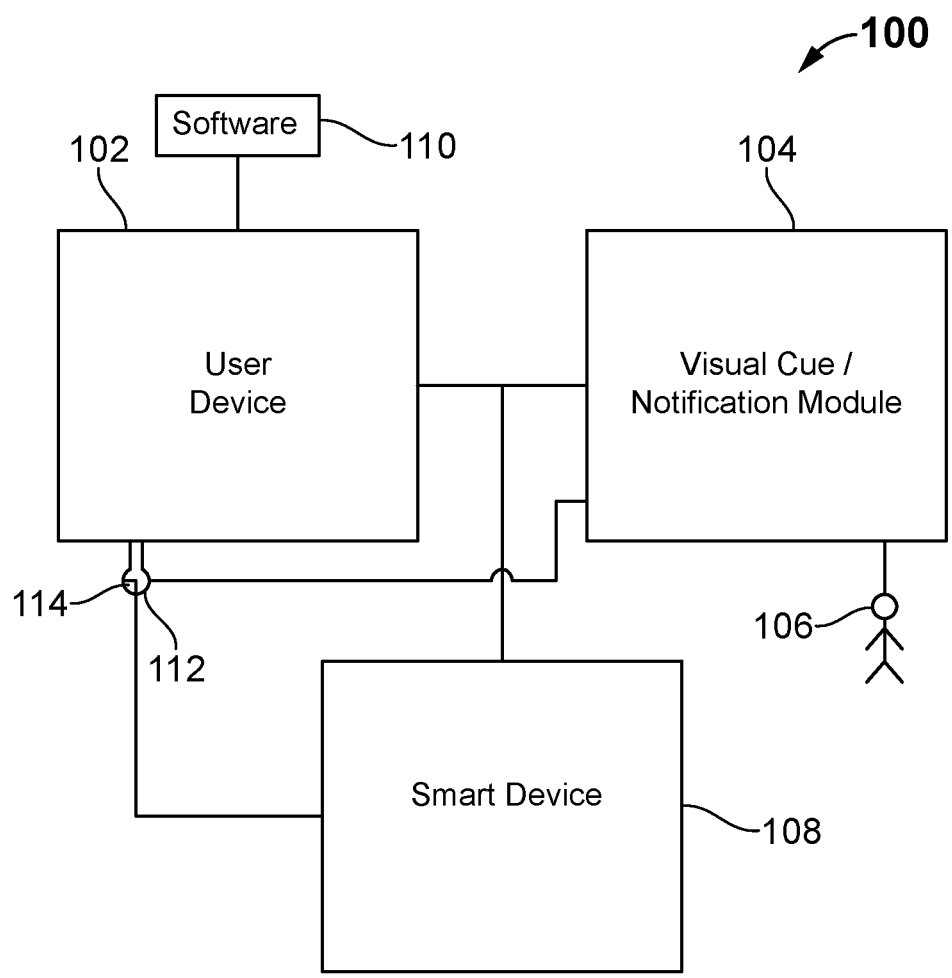
FIG. 1 is a block diagram illustrating a conference notification system generally in accordance with some embodiments.

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Reference will now be made in detail to various embodiments. Each example is provided by way of explanation and is not meant as a limitation and does not constitute a definition of all possible embodiments. The described embodiments are to be considered in all respects only as illustrative and not restrictive. For purposes of illustrating features of the embodiments, a simple example will now be introduced and referenced throughout the disclosure. Those skilled in the art will recognize that this example is illustrative and not limiting and is provided purely for explanatory purposes. An example of a computing system environment is disclosed. The computing system environment is not intended to suggest any limitation as to the scope of use or functionality of the system and method described herein. Neither should the computing environment be interpreted as having any dependency or requirement relating to any one or combination of components illustrated in the exemplary operating environment.

Embodiments of the disclosure are operational with numerous other general purposes or special purpose computing system environments or configurations. Examples of well-known computing systems, environments, and/or configurations that may be suitable for use with the systems and methods described herein include, but are not limited to, personal computers, server computers, hand-held or user device devices, multiprocessor systems, microprocessor-based systems, set top boxes, programmable consumer electronics, network PCs, minicomputers, mainframe computers, distributed computing environments that include any of the above systems or devices, and the like.

The embodiments of the disclosure may be described in the general context of computer-executable instructions, such as program modules, being executed by a computer or smart device. Generally, program modules include routines, programs, objects, components, data structures, etc. that perform particular tasks or implement particular data types. The systems and methods described herein may also be practiced in distributed computing environments where tasks are performed by remote processing devices that are linked through a communications network. In a distributed computing environment, program modules may be located in both local and remote computer storage media including memory unit or storage devices. Tasks performed by the programs and modules are described below and with the aid of figures. Those skilled in the art can implement the exemplary embodiments as processor executable instructions, which can be written on any form of a computer readable media in a corresponding computing environment according to this disclosure.

Components of a computer or smart device may comprise a processing unit, a system memory, and a system bus that couple various system components including the system memory to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computers and smart devices may comprise a variety of computer readable media. Computer readable media can be any available media that can be accessed by computer and comprises both volatile and non-volatile media, removable and non-removable media. By way of example, and not limitation, computer readable media may include computer storage media and communication media. Computer storage media comprises both volatile and non-volatile, removable and non-removable media implemented in any method or technology for storage of information such as computer readable instructions, data structures, program modules or other data. Computer storage media comprises, but not limited to, Random Access Memory (RAM), Read-Only Memory (ROM), Electrically Erasable Read-Only Memory (EEPROM), flash memory or other memory technology, Compact Disk Read-Only Optical Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer.

As used herein, the term "computer" or "user device" refers to any computing device that is used when a user is participating in a conference call. As used herein, "conference call" refers to any time a user is on video or audio using his or her user device. As used herein "proximate persons" or "proximate people" refers to any person that is close enough in proximity to disturb the user's conference call in any way. As used herein, "Smart Device" may comprise any device that is connected to other devices or networks via different wireless protocols sand that that can operate to some extent interactively and autonomously, or may be a smart phone. As used herein, the notification device refers to the visual cue that is in communication with the user device.

Referring now to FIG. 1, an exemplary block diagram showing a system to notify a proximate person that a user is on a conference call is shown generally at reference numeral 100. As shown, the system comprises a user device 102 and a notification module 104 in communication with each other. The system 100 may be integrated into the user device via downloadable software that utilizes the user device via software module 110. The downloadable software may be in the form of a software module, mobile application or a API hat also utilizes and detects the user device 102 software and hardware components including but not limited to processors, RAM, AV module and internal shortwave communication (e.g., Bluetooth®), WiFi, and detects user actions on the hardware and software on the user device 102. In this way, the system 100 via software module 110 is configured to recognize when a user is on a conference, and in turn, signals the notification module 104 which may be an external cue that activates when the user is utilizing certain hardware and software indicative of a conference call to notify persons 106 that they are on a conference. In other embodiments, the system monitors IP traffic to determine which device is on a conference call. The system may be configured to choose which method it utilizes based on sensed network speed or CPU speed and/or latency requirements. In operation, the notification module activation provides a visual cue to others that the user is participating in a conference call and should not be disturbed. In embodiments, the user may turn the system off and on. Depending upon the methods chosen, the user may configure what to monitor (i.e., select which web camera to use), or the application automatically may do it automatically (i.e., add new IP addresses to monitor). Furthermore, the device may turn on/off based on a schedule set by the user, so that the user may have it turn on from 10 AM to 11 AM every day when the user doesn't want to be disturbed.

In embodiments, the software module 110 is configured to turn the user device into do not disturb mode so that other platforms are disabled so as to not disturb the user.

In other embodiments, the system comprises plug and play interface such as a USB 112 or similar plug in loaded with software 110. The USB 112 comprises its own dedicated short wave transmitting module 114 (e.g., Bluetooth®) or WiFi which is in communication with the notification module 104. Having a USB 112 or other plug in is useful in situations where the smart device is not enabled with communications interfaces that are able to send or receive signals from the notification module. In this way, the system does not require components from any user device and is provided with two components: the USB 112 and visual cue (described in greater detail with reference to FIGS. 4-10). Further, in optional embodiments, the USB 112 may communicate directly with smart device 108 to alert the proximate person the user is on a conference call and should not be disturbed. In operation, the USB 112 or similar plug-in comprises software that communicates with the electronic devices visual and audio software to recognize when a user is on a conference, and in turn, signals the external cue to activate.

Figure 2:
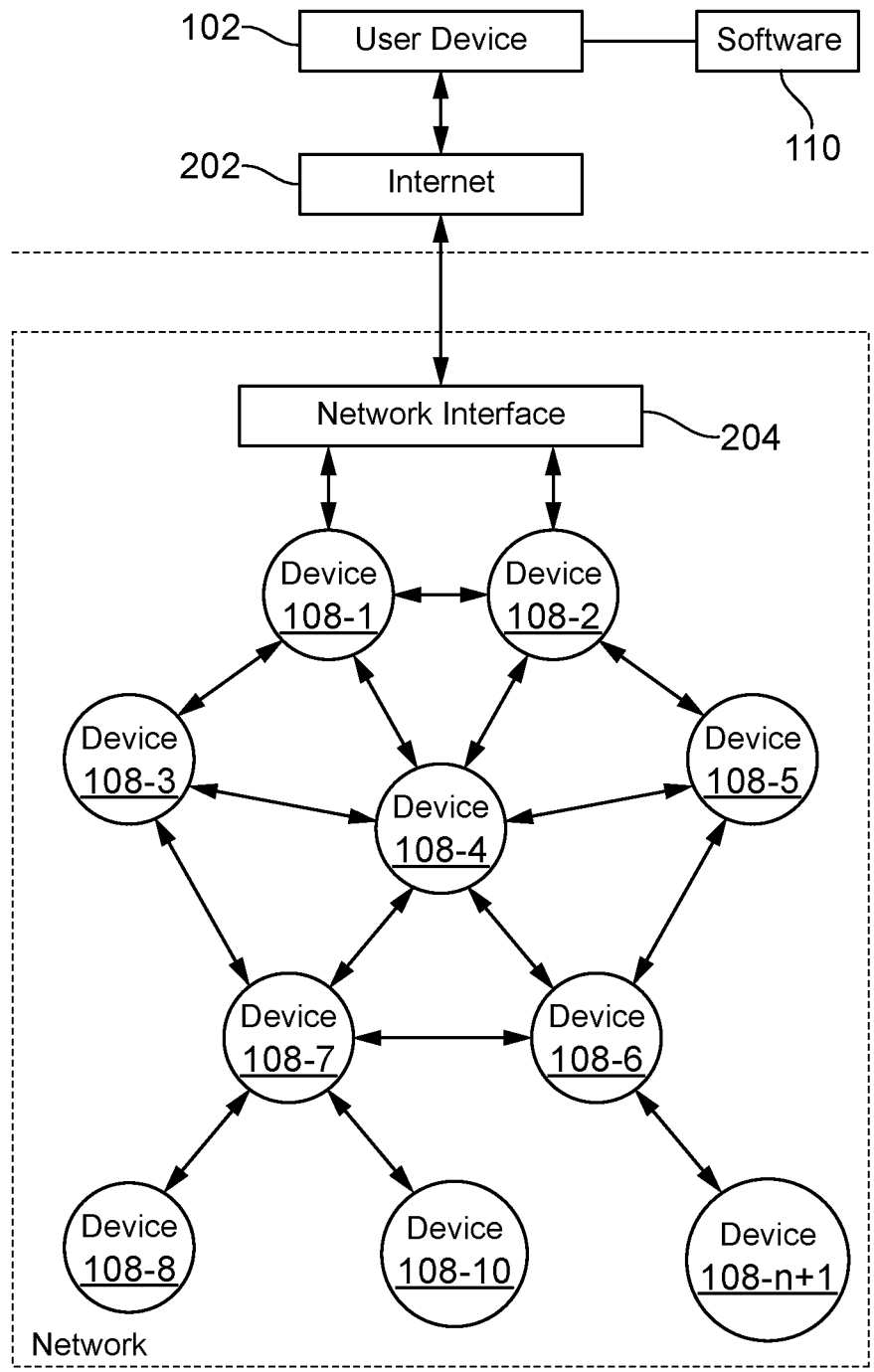
FIG. 2 illustrates an exemplary network architecture that includes a messaging platform to notify users of conferences in accordance with some embodiments.

With reference now to FIG. 2, an exemplary network architecture that comprising a messaging platform to notify users of conferences in accordance with some embodiments is shown generally at 200. As shown, the user device 102 is in communication with a network interface 204 via network 202. In this embodiment, the user device 102 comprises software module 110, but may also have USB 112 installed. The notifications in this embodiment are messages to proximate smart devices 108 that occur via a network interface 204, such as a home WiFi network. In this embodiment, the system may create a mesh network utilizing all smart devices in the house, for example, tablets, user devices, phones, and smart devices such as Amazon® Alexa®.

In some embodiments, there are multiple smart devices 108 in a home (or outside of the home in some embodiments), for example. If a person utilizing the user device 102 is in a conference, the notification device 104 sends notifications (e.g., SMS, push messaging, etc.) to smart devices (nodes) 108-1 through 108-n+1. In operation, when the system 100 recognizes the user is a conference call, an automated message may be sent to any, all, or each of the proximate smart devices 108-1 through 108-10 saying, for example, "Pat is on a conference call. Do not disturb". Furthermore, through location data of a smart home for example, the system may, using user device geo-location services or short-wave communication, alert other proximate users that "Pat is on a conference call in the basement. Do not disturb" or Pat is on conference call in the upstairs office. Do not disturb". Optionally, the system may alert or notify proximate users when the user is off of the conference call. The system, utilizing the mobile application, may further allow for user configuration of which proximate user's get messages, and which do not via configuration module described in further detail with relation to FIG. 4.

Figure 3:
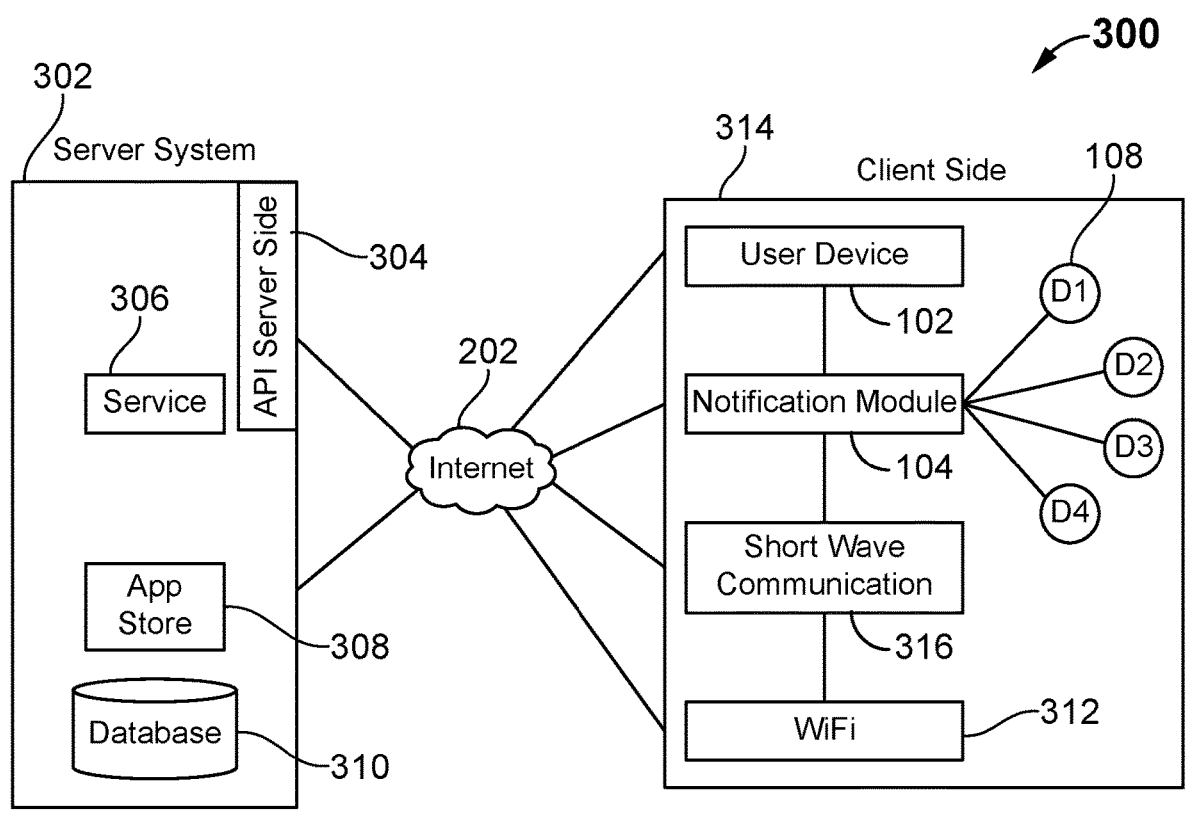
FIG. 3 illustrates a network-level view of a server side and a client-side platform with which conference notification are integrated in accordance with some embodiments.

Referring now to FIG. 3 illustrates a network-level view of a server-side and client-side notification platform with which conference notification are integrated in accordance with some embodiments shown generally at 300. As shown, a server system 302 is provided. The server system may comprise server-side API 304, services module 306, mobile application module 308, and user database 310. The server-side API 304 may be configured to enable communication with client side 314. The services module 306 is configured to communicate with conference call applications, including but not limited to Zoom®, Skype®, and Teams®. The services module is configured to automatically recognize a type of conference a user is on and configure the module for that particular mode. The App Store 308 allows the user to download mobile application via Internet 202. User database 310 gathers information about the user in stores certain data regarding conference calls messaging location in the like.

The internet/network 202 provides communications from server side 302 to client side 314. Client side 314 comprises communicative abilities for user device 102, notification module 104, short wave communication module 316 and Wi-Fi module 312. In operation, the user may download a mobile application from app store 308 and utilizing API 304, services module 306 and internet 202, download the software on the user device 102. On this client side, when a user is in conference, the notification module via short wave communication 316 and/or WiFi module 312, automatically recognize smart devices 108 and send them do not disturb type messages or notifications so that if a user is on a conference call, or to avoid a certain area of the house because the user is on a conference call.

Figure 4:
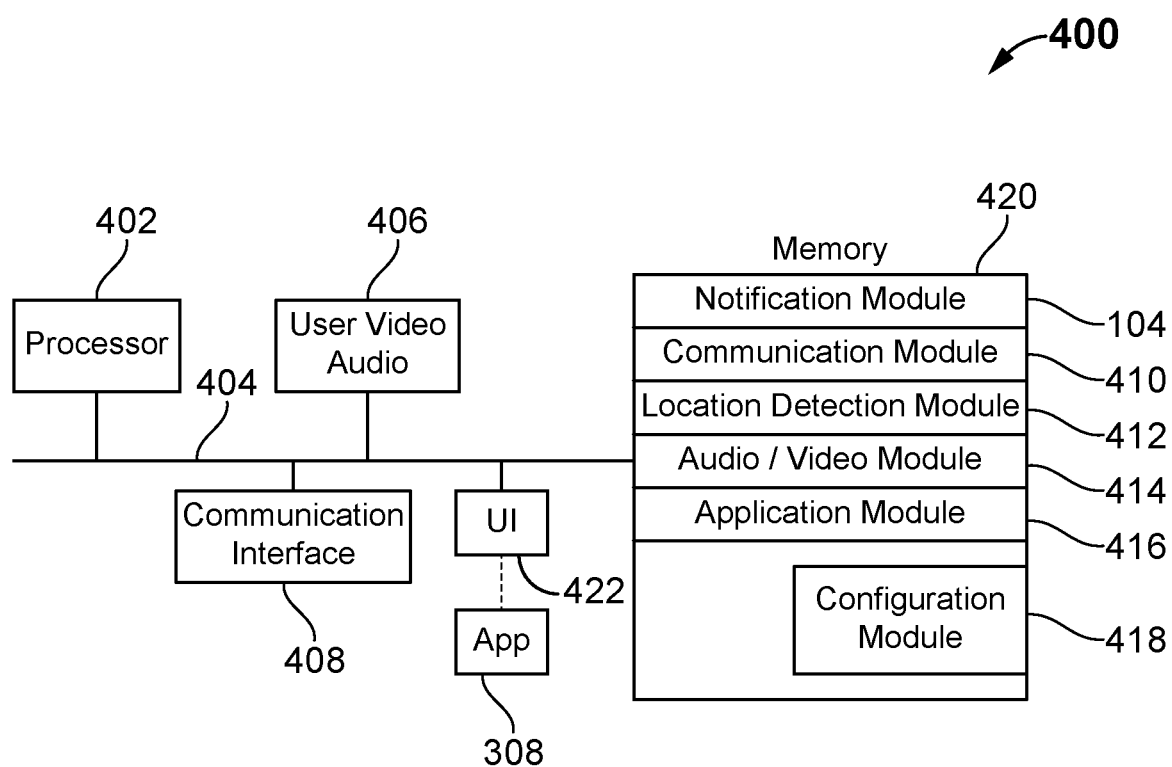
FIG. 4 illustrates an abstracted functional view of the extensible devices and services platform of FIG. 3, with reference to a processor and communications modules in accordance with some embodiments.

Referring now to FIG. 4, an abstracted functional view of the extensible modules of FIG. 3, with reference to a processor and communications bus of the user device and the API (or the USB) together in accordance with some embodiments is shown at reference numeral 400. The system comprises a processor 402, audio video 406, one or more network or other communications interfaces 408, memory 420, and one or more communication buses 404 for interconnecting these components. The communication buses 404 optionally include circuitry (sometimes called a chipset) that interconnects and controls communications between system components. In some embodiments, system includes a user interface 422. The user interface 422 may include a display screen that populates automatically when the mobile application 308 is opened and is in communication with the configuration module 418. In this way, the user can configure types of messages to be sent during conference, a predetermined maximum or minimum distance proximate devices may be in to receive a message, which of their contacts may receive a message, and the like.

Memory 420 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid state storage devices. Memory 420 may optionally include one or more storage devices remotely located from the processor(s) 402. Memory 420 may comprise a number of the modules discussed herein: Notification module 104, communication module 410, location detection module 412, audio video module 414, application module 416, and configuration module 418, for example. In embodiments, Notification module is configured to notify proximate user devices of a conference, communication module 410 is configured to work with short way of communication and WiFi to send messages. Location detection module 412 is configured to utilize the GPS of a smart device and pinpoint the location of the user automatically or utilize WiFi and other in-home routers to pinpoint user location automatically without user intervention.

With reference now to FIGS. 5-10, whereas in some embodiments the system messages a proximate user device (e.g., smartphone), other embodiments utilize visual cues that are either attached to the user device, or in communication with user device so notify people proximate the user, visually, that the user is on a conference and to not disturb them based on a visual cue.

Figure 5:
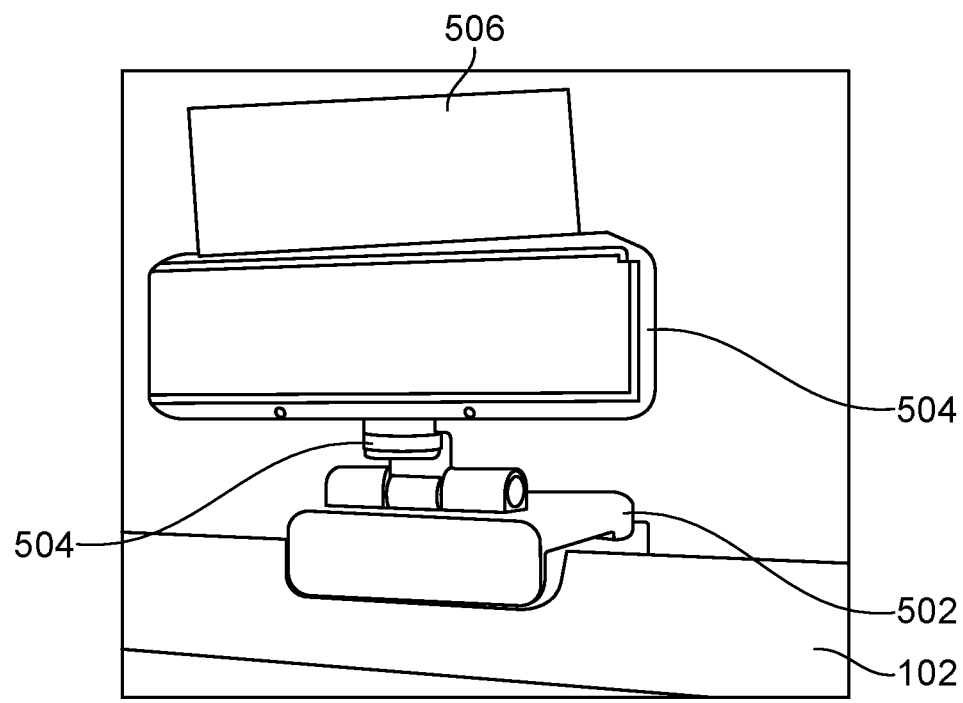
FIG. 5 illustrates a perspective view of an exemplary visual cue device used for allowing persons proximate to a user on a conference call in some embodiments of the present invention.

Referring now to FIG. 5, in embodiments, the physical cue comprises a mounting device 502 comprising a small tripod or stand 504, which is affixed to the top of the user device 102 or electronic device, for example, a computer or a user device. A flag 506 in one embodiment is disclosed. In one embodiment, the system 100 is configured to allow users for identifying a participant who participates in a video and/or audio conference call using an electronic device, for example, a computer user device 102 by a visual sign such as a flag 506, a light 618 (shown in FIG. 6), a strobe 710 (shown in FIG. 7), or some other similar physical cue which would turn on when the participant is using the video and/or audio devices such as a microphone and a camera of the electronic device, for example, a computer or a user device 102.

In one embodiment, the system 100 comprises a mounting device or a small tripod or stand 504 to which a visual cue may be attached, or the mounting itself may be the visual cue and may be affixed to the top of the user device or electronic device, for example, a computer or a user device 102. In one embodiment, the mounting device, small tripod or stand may be free-standing or attached to a surface (i.e., outside a door), or be built directly into other hardware devices (i.e., web camera, monitor, etc.). In this way, the visual cue is easily seen by people proximate the participant, or mounted to a door, ensures that no one comes in the room where the conference is taking place.

Once the person is "off" of their meeting, the visual sign, for example, a flag 506 would return its "off" status so that others could easily notice the participant off their meeting. The different mounting mechanisms allow the visual signs to be used across different computing platforms (computer, mobile device, etc.). In one embodiment, the visual sign, for example, a flag 506 may be rotated around so that it could be seen in different ways depending upon where the participant sitting in relation to others.

Figure 6:
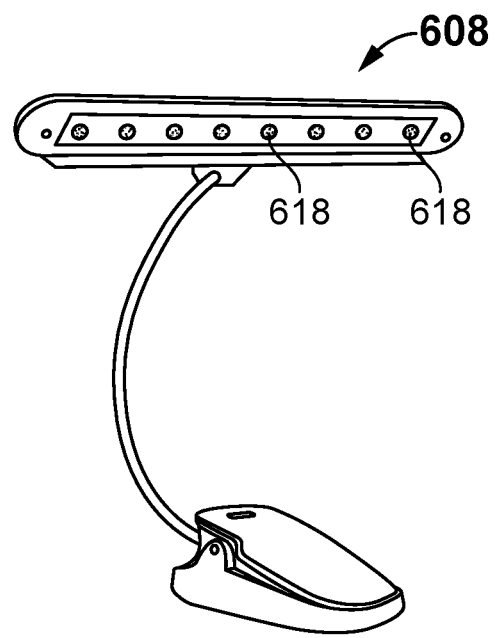
FIG. 6 illustrates a perspective view of another exemplary visual cue device used for allowing persons proximate to a user on a conference call in some embodiments of the present invention.

Referring to FIG. 6, the visual cue is a stand 608 provided with lights 618 (e.g., LED), thereby providing a visual sign and allowing others to identify the user or participant during the conference call according to another embodiment is disclosed. In one embodiment, the system 100 is further configured to provide a visual sign using LED lights 618, which are provided to the notification device or stand 608. In one embodiment, the LED lights 618 are activated and illuminated when the participant participates in a video and/or audio conference call thereby allowing others to identify the participant during a conference call by the visual sign using the notification device or stand 608 provided with LED lights 618. Depending on the implementation, it may be powered via standard or rechargeable batteries, plugged in via a USB cable or other power sources, or a small set of solar cells. In an embodiment, the LEDs are configured to change color such to indicate red for "Busy" and green for "Free". In an embodiment, the stand or light portion may comprise hardware and software with communication protocols that allow communication between the user device or USB.

In other embodiments, an electronic sign may be used as a visual cue. The signs may be configurable such that a user can phrases such as "On a Call", "I'm Busy", "Don't Disturb", etc. The stand-alone visual cue may wireless connect to multiple user devices and have addressable cues such that multiple users may connect to it and assign a part of the device to them and another user. For example, they may comprise four LEDs, and two people may share that device: One use may have the two LEDs on the right turn on/off, and the other may have two LEDs on the left turn on/off. This way if the right-half is on, we could know that Mom is on a conference, or if all four lights are on, then both Mom and Dad are on a conference.

Figure 7:
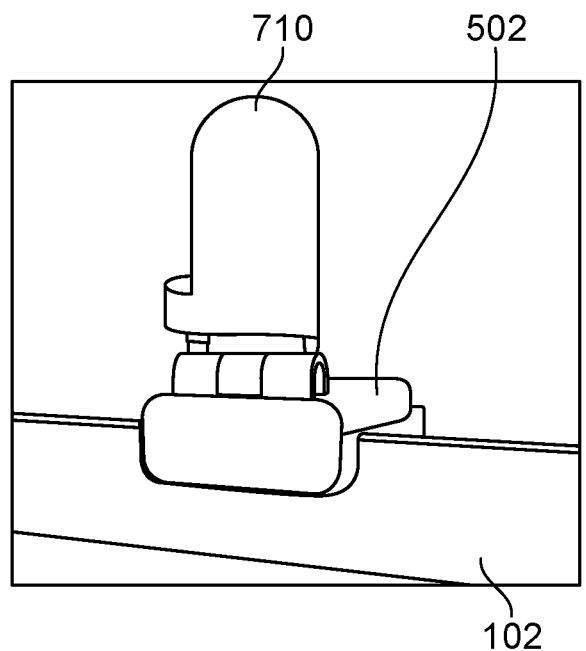
FIG. 7 illustrates a perspective view of a mounting device of the system provided with a strobe used for allowing persons proximate to a user on a conference call in some embodiments of the present invention.

Referring to FIG. 7, the mounting device 502 is attachable to a strobe 710, thereby providing a visual sign and allowing others to identify the user or participant during the conference call according to another embodiment is disclosed. In one embodiment, the system 100 is further configured to provide a visual sign using a strobe 710, which is affixed to the mounting device or small tripod or stand 502. In one embodiment, the strobe 710 could be activated and illuminated when the participant participates in a video and/or audio conference call using the user device 102.

Figure 8:
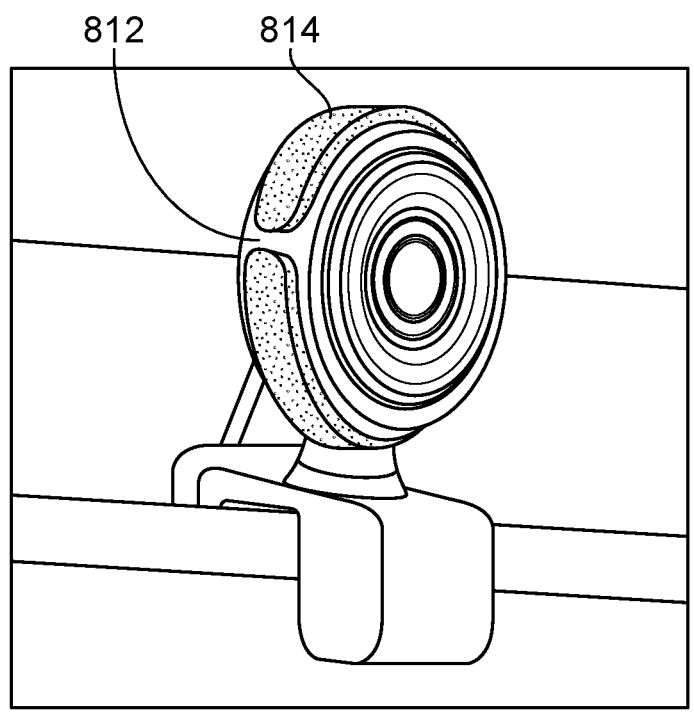
FIG. 8 illustrates a perspective view of a web-camera provided with a housing having illumination regions, thereby providing a visual cue to persons proximate to a user on a conference call in some embodiments of the present invention.

Referring to FIG. 8, a web-camera 812 provided with a housing having illumination regions 814, thereby providing a visual sign and allowing others to identify the user or participant during the conference call according to another embodiment is disclosed.

Figure 9A:
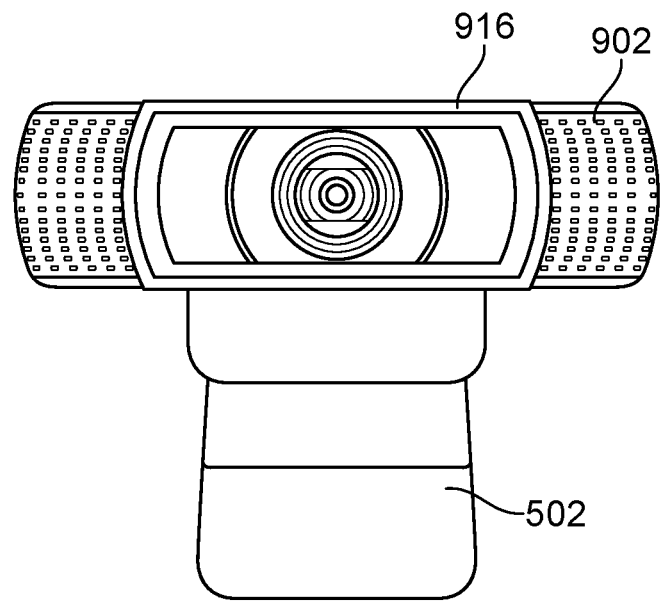
FIGS. 9a and 9b shows a perspective view of a web-camera configured with a pop-up flag, thereby providing a visual cue to persons proximate to a user on a conference call in some embodiments of the present invention.
Figure 9B:
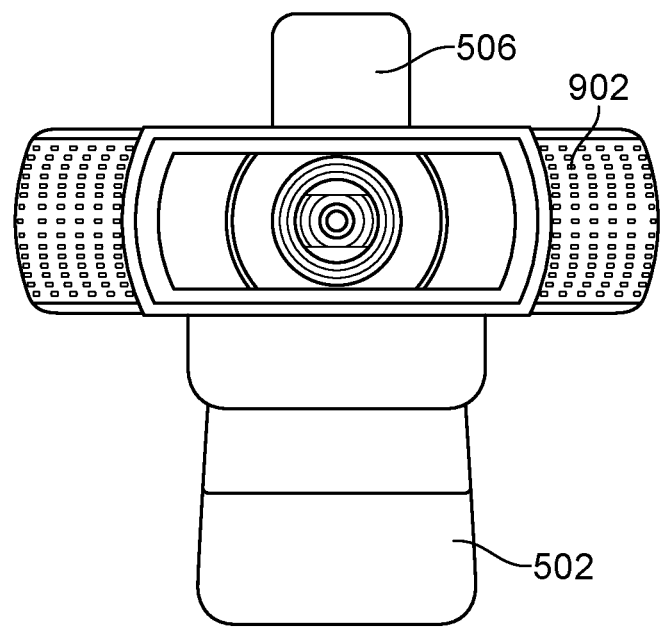

Referring to FIGS. 9A-9B, a web-camera 916 configured to pop out notification 902, thereby providing a visual sign and allowing others to identify the user or participant during the conference call according to another embodiment is disclosed. In another embodiment, the web-camera 916 is configured pop out lights for example or may just be a flag type notification.

Figure 10:
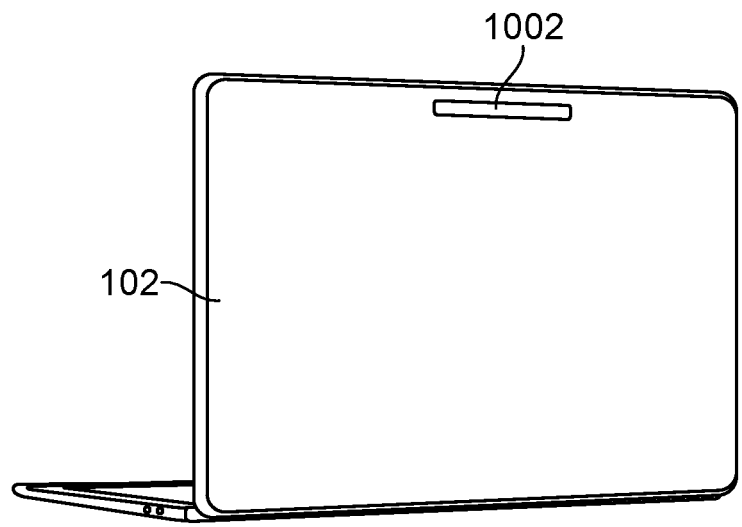
FIG. 10 shows a perspective view of a user device provided with a light-emitting diode (LED) thereby providing a visual cue to persons proximate to a user on a conference call in some embodiments of the present invention.

Referring to FIG. 10, a user device 102 is provided with a light such as a light-emitting diode (LED) 1002, thereby providing a visual sign allowing others to identify the user or participant during the conference call in yet another embodiment of the present invention. In one embodiment, the LED light 1002 could be activated and illuminated when the participant participates in a video and/or audio conference call using the electronic device, for example, a user device 102, thereby allowing others to identify the participant during the conference call by the visual sign using the LED light 1002. The LED light may be affixed to the computer and comprise and short-range communication that is in communication with the system 100.

Figure 11:
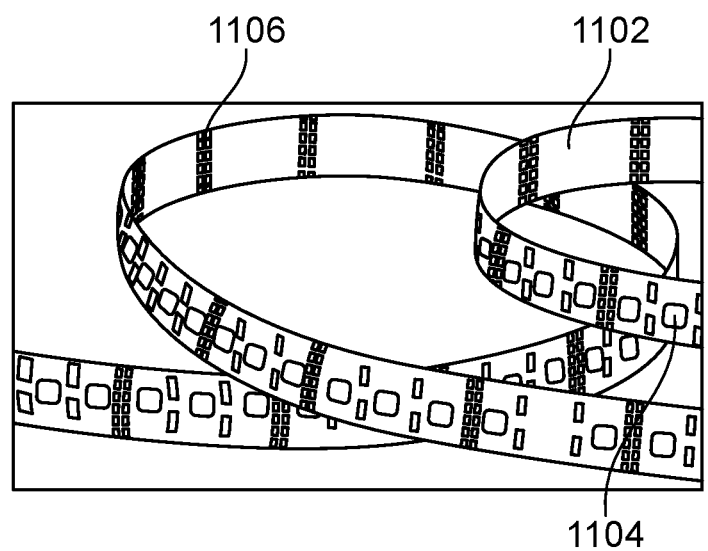
FIG. 11 shows a perspective view of a visual cue device, namely, an LED ribbon in some embodiments of the present invention

Referring now to FIG. 11 a shows perspective view of a visual cue device, namely, an LED ribbon 1102 is shown. In this embodiment, the LED ribbon comprises multiple LEDs 1104 and wireless communication 1106. The LED ribbon may be in communication with the device such that some of the lights turn on when certain users are on a conference call. They may also comprise different colors to alert people of who is on a conference call. The LED ribbon may be hung on an object or affixed to a door for example.

Figure 12:
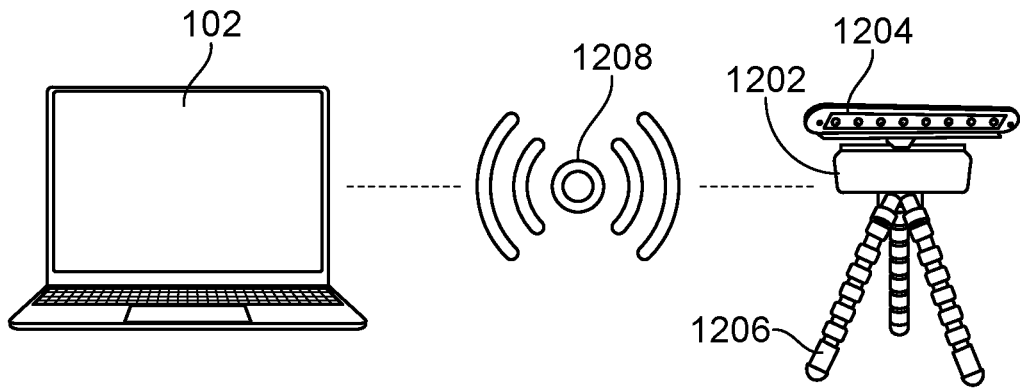
FIG. 12 shows a schematic view of a conference notification system utilizing a lighting device in accordance with some embodiments.

Referring now to FIG. 12, a schematic view of a conference notification system utilizing a lighting device in accordance with some embodiments is shown. In this embodiment, the user device 102 comprises the notification software, and communications directly with a docking station 1202 via short wave communication 1208 or WiFi. The docking station 1202 comprises a wire 1204 that is detachable to the docking station via USB or other electrical connections. A stand 1206 is provided and is attachable to the bottom of the docking station. The stand can be any type of device that holds the docking station in place. In embodiments, wireless communication/protocol can either be built in directly to the user device, or it can be provided via a docking station that contains short wave communication (Bluetooth®) or WiFi hardware. The docking station 1202 is configured to receive the commands from the user device wirelessly and pass it onto the device via the USB connection that was made when it was docked. The power may also be transmitted via the wired connection or be powered by a battery either inside the unit or within the docking station.

Figure 13:
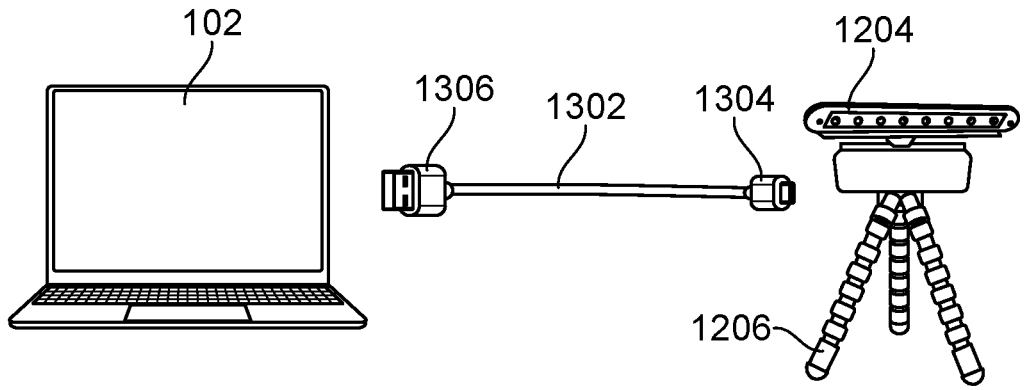
FIG. 13 shows a schematic view of a conference notification system utilizing a lighting device in accordance with some embodiments.

FIG. 13 shows a schematic view of a conference notification system utilizing a lighting device in accordance with some embodiments. This schematic is similar to that shown in FIG. 12 except for is a wired USB 1302 having a connector 1306 for the user device and connector 1304 for the docking station 1202, light 1204, or tripod 1206.

Figure 14:
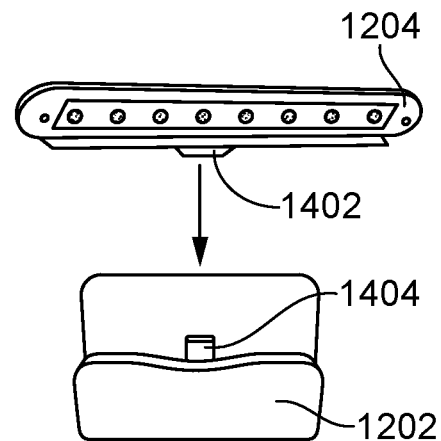
FIG. 14 shows a schematic of a lighting docking station with a light in accordance with some embodiments.

FIG. 14 shows a schematic of a lighting docking station with a light in accordance with some embodiments. As can be seen, the light 1204 comprises a female USB connection 1402 which mates with docking station 1202 connection 1404. In this way, a user can replace/use multiple cues using the docking station 1202 (e.g., switch lights to a flag or audio cue). The docking station 1202 may also provide power to the visual cues. The hardware for communication may be in the docking station or the light portion.

In embodiments, a smart device (such as Amazon® Alexa®) invoke aspects of the device functionality. For example, the module may trigger the smart device to Alexa® to set the unit to "Do Not Disturb", turn off any currently playing music, or turn on background lights when a user is on a conference.

Preferred embodiments of this invention are described herein, including the best mode known to the inventors for carrying out the invention. It should be understood that the illustrated embodiments are exemplary only and should not be taken as limiting the scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for alerting individuals when a user is a participant of a conference call, the system comprising:
 a software application downloadable to a user device associated with a user, wherein the user device comprises an audio or video interface that allows the user to participate on a conference call, and wherein the software application is configured to detect if the user is on the conference call;
 a network interface configured to communicate with a network, the user device, an individual's device associated with the individual and internet of things (IoT) devices, wherein the IoT devices are proximate the network interface, and wherein the software application is configured to communicate with the network interface to initiate communication with the user device, the individual device, and the IoT devices proximate the user;
 a notification module configured to communicate over the network and notify the individual devices and the IoT devices when the user is on a conference call and when the user is off the conference call; and
 a visual cue in communication with the software application via the communication interface, wherein the cue is configured to simultaneously receive an input from software application when the user is on the conference call, and in response, trigger the visual cue so that the proximate individuals are is alerted that the user is on a conference call.

2. The system of claim 1, wherein the system further comprises:
 a mobile application server having an application program interface (API), wherein when the software application is downloaded onto the user device, the API is configured to allow communication between the mobile application server and the user device.

3. The system of claim 1, wherein the software application comprises a communication module configured to interact with the user devices wireless communication, shortwave communication, or both, and when signaled by a processor, direct the user's device to send an output to the visual cue.

4. The system of claim 3, wherein the visual cue is a separate device visual cue comprising:
 a processor;
 a notification module configured to receive the output from the communication module, and in turn, trigger the separate device visual cue.

5. The system of claim 3, wherein the communication module is in communication with the network, and is configured to analyze network traffic to detect if the user is on the conference call, and wherein the communication module automatically utilizes either the use of the audio video components or the network traffic to determine if the user is on the conference call depending upon processing speed.

6. The system of claim 1, wherein the cue comprises a lighting device that is attachable or mountable such that it is viewable by the individual when the individual is proximate the user participating in the conference call.

7. The system of claim 1, wherein notification comprises a message to a smart device that is proximate the individual.

8. The system of claim 1, wherein the communication module is configured to analyze a user device usage to detect if the user is on the conference call or communicate with a third party mobile application to detect if the user is on a conference call.

9. A system for alerting individuals when a user is a participant of a conference call, the system comprising:
 a plug interface configured to connect to a user device, wherein when connected to the user device the plug interface is configured to communicate with the user device to detect if the user is on the conference call;
 a wireless communication protocol disposed within the plug interface and configured to communicate with the user device, an individual's device associated with the individual and internet of things (IoT) devices, wherein the IoT devices are proximate the user, and wherein the plug interface is configured to communicate with the network and initiate communication with the user device, the individual's device, and the IoT devices proximate the user;
 a notification module disposed in the plug interface, wherein the notification module is configured to communicate over the network to notify the individual devices and the IoT devices when the user is on a conference call and when the user is off the conference call; and
 a visual cue in communication with the plug interface via the wireless communication protocol disposed within the plug interface, wherein the visual cue is configured to simultaneously receive an input from plug interface when the user is on the conference call, and in response trigger the visual cue so that the individuals are alerted that the user is on a conference call.

10. The system of claim 9, wherein the plug interface comprises a software module downloadable onto the user device when connected to the user device, and wherein the software module communicates with an audio or video interface of the user device.

11. The system of claim 9, wherein the wireless communication protocol is configured to interact with user device wireless communication, shortwave communication, or both, and when signaled by a processor, direct the user's device to send an output to the visual cue.

12. The system of claim 11 wherein the visual cue is a separate device visual cue comprising:
 a processor;
 a notification module configured to receive the output from the communication module, and in turn, trigger the separate device visual cue.

13. The system of claim 12, wherein the visual cue comprises a lighting device that is attachable or mountable such that it is viewable by the individual when the individual is proximate the user participating in the conference call.

14. The system of claim 13, wherein the notification comprises a message to a smart device that is proximate the individual.

15. The system of claim 9, wherein the plug interface is in communication with a network, and is configured to analyze network traffic to detect if the user is on a conference call, and wherein the plug interface automatically utilizes either the use of the audio video components or the network traffic depending upon a processing speed.

16. The system of claim 9, wherein the communication module is configured to analyze a user device usage to detect if the user is on the conference call or communicate with a third-party mobile application to detect if the user is on a conference call.

17. A processor-based method for alerting individuals when a user is a participant of a conference call, the method comprising:
 downloading to software application to a user device associated with a user, wherein the user device comprises an audio or video interface that allows the user to participate on a conference call, and wherein the software application is configured to detect if the user is on the conference call;

communicating with a network, the user device, an individual's device associated with the individual and any internet of things (IoT) devices, wherein the IoT devices are proximate the user, and wherein the the communicating occurs via via a network interface;

initiating communication between the user device, the individual device, and the IoT devices proximate the user;

notifying the individual devices and the IoT devices when the user is on a conference call and when the user is off the conference call via a notification module configured to communicate over the network;

simultaneously with the notification step, triggering a visual cue when the user is on the conference call, so that the proximate individuals are is alerted that the user is on a conference call.

18. The method of claim 17, further comprising providing an API configured to allow communication between the mobile application server and the user device.

19. The method of claim 17, wherein the communication module is configured to analyze a user device usage to detect if the user is on the conference call or communicate with a third-party mobile application to detect if the user is on a conference call.

* * * * *